May 14, 1929.    W. L. WALKER    1,713,063
METHOD FOR FINDING THE DIRECTION OF SOUND
Original Filed April 25, 1925    2 Sheets-Sheet 1

INVENTOR.
William L. Walker
BY
Sheffield & Betts
HIS ATTORNEYS.

May 14, 1929. W. L. WALKER 1,713,063
METHOD FOR FINDING THE DIRECTION OF SOUND
Original Filed April 25, 1925 2 Sheets-Sheet 2
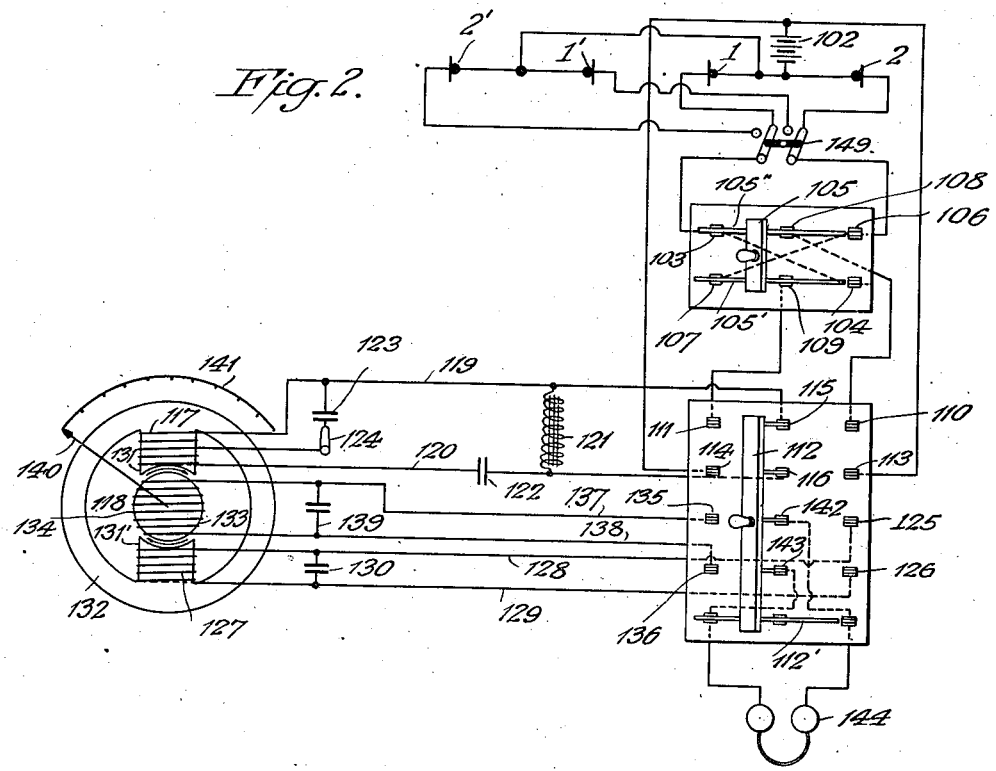
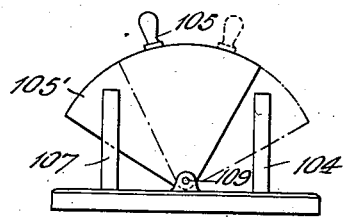
INVENTOR.
WILLIAM L. WALKER.
BY
HIS ATTORNEYS Patented May 14, 1929.

1,713,063

UNITED STATES PATENT OFFICE.

WILLIAM L. WALKER, OF NEW YORK, N. Y., ASSIGNOR TO WALKER SIGNAL & EQUIPMENT CORPORATION, A CORPORATION OF DELAWARE.

METHOD FOR FINDING THE DIRECTION OF SOUND.

Application filed April 25, 1925, Serial No. 25,794. Renewed October 12, 1928.

This application is a continuation in part of application Serial No. 552,024 filed by me April 12, 1922. The method claims made herein are also applicable to the apparatus and circuits of Figs. 1 and 2 of my copending application Serial No. 25,011 filed April 22, 1925, as well as to the circuits of Fig. 1 of this application.

My invention relates to the detection of sound direction. Although it may be used for other purposes, it is particularly adapted for navigational purposes to detect the direction of sound vibrations emitted from submarine signals and the like. In the present arrangement, microphones in spaced relation are employed which may alternately be connected to a telephone circuit to detect sound. An adjustable transformer, a variable transformer and means are provided whereby the transformers may be alternately connected to the telephone circuit and the intensity of the sound vibrations received by one of the microphones varied to correspond to the sound vibrations received by the other of the microphones, the balancing of the sounds being accomplished by means of the variable transformer. A visible indicating device is operated by this transformer graduated to indicate the direction from which the sound originates, the position being determined by the variations of intensity in the sounds received through the two microphones, as will be more fully described.

The object of my invention is to provide an improved method and apparatus for detecting the direction of sound, which is simple, efficient and reliable.

My invention will be better understood from the following description taken in connection with the accompanying drawings and its scope will be pointed out in the appended claims.

In the drawings, Fig. 1 is a diagrammatic view of the circuits and apparatus illustrating an embodiment of my invention.

Fig. 2 is a diagram of the circuits and apparatus of another embodiment of my invention.

Fig. 3 is an end view of the microphone switch illustrated in Fig. 2.

Figure 1:
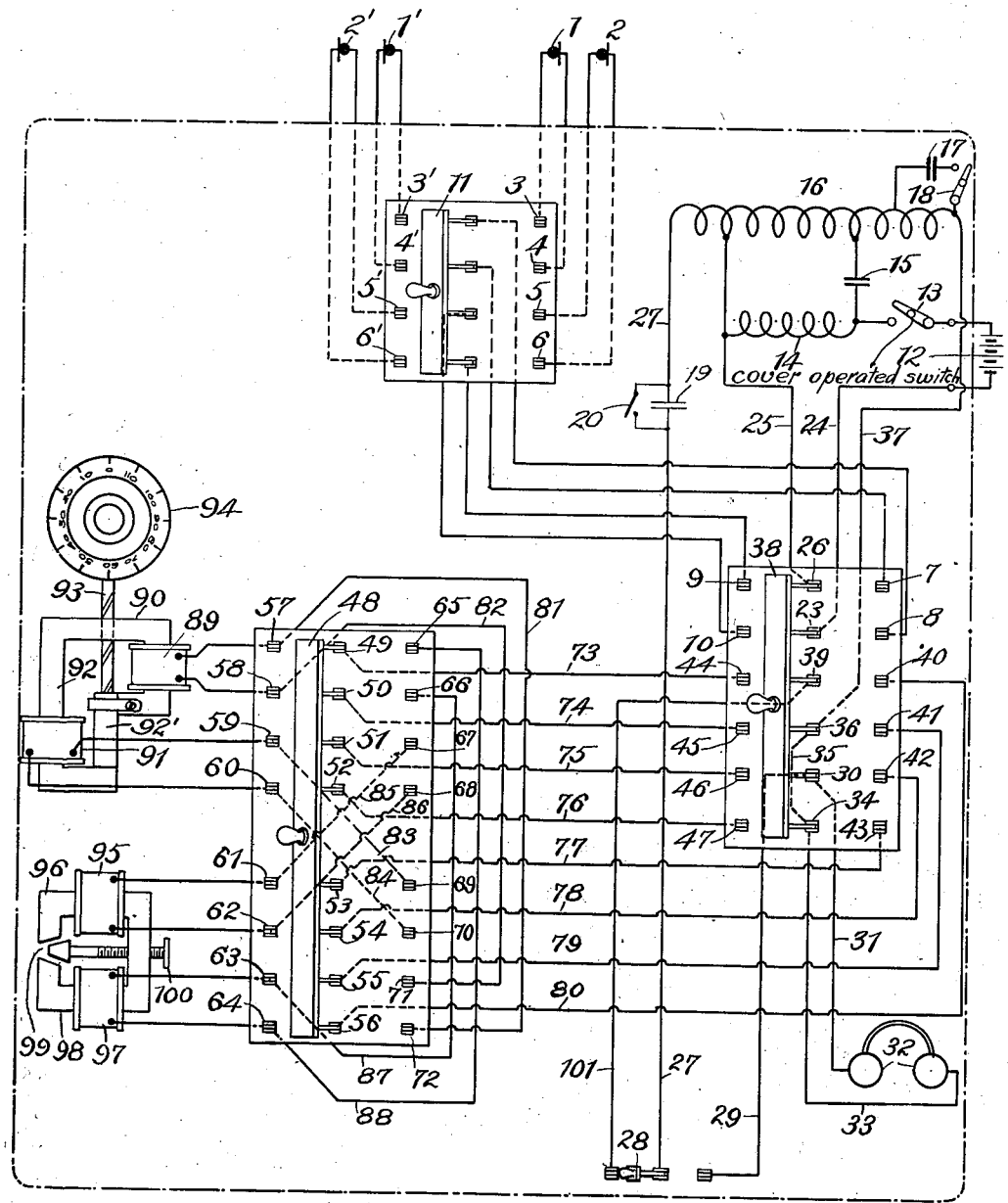

Referring to the drawings, the numerals 1 and 2 indicate microphones, which may be of any standard type, and which are electrically connected to contacts or terminals 3, 4 and 5, 6 respectively. When my invention is employed on board ship, the microphones 1 and 2 are positioned in the bow of the ship below the water-line on the starboard and port sides respectively. As a matter of safety, a duplicate set of microphones may be provided as indicated at 1' and 2', connected with similar contacts 3', 4' and 5', 6' respectively. Either of the starboard microphones 1 and 1', or either of the port microphones 2 and 2' may be connected to contacts 7, 8 or 9, 10 respectively by means of a double throw switch 11. As shown, the contacts 3, 4, 5, 6 are on one side and the contacts 3', 4', 5', 6' are on the opposite side of the switch lever so that when the switch 11 is thrown to the right, microphones 1 and 2 are respectively connected to contacts 7, 8 and 9, 10, and when thrown to the left, microphones 1' 2' are respectively connected to contacts 7, 8 and 9, 10.

The telephone circuit comprises a battery 12, battery switch 13, reactance coil 14, condenser 15 and an amplifying auto-transformer 16. It will be observed from Fig. 1 that the battery 12 is connected by means of a conductor 24 to the terminal or contact 23 and that the coil 14 is connected by means of the conductor 25 to the terminal or contact 26. A condenser 17 is connected in shunt with a portion of the transformer 16 and may be connected or disconnected therewith by a switch 18. Received sounds are greatly increased in volume by making the condenser 17 of the proper capacity, preferably of about one microfarad. This result is effective over a wide range of frequencies of the received sounds. The usual frequencies of received signals range from 50 to 1200 vibrations per second and I have found that one microfarad condenser is most efficient over that range of frequencies and does not apparently involve any question of resonance of the receiving circuit. Why this effect occurs I cannot at present explain but that it does exist I have proven by repeated practical tests on sea-going vessels. The impedance of the coils included between the terminals of the condenser when the switch 18 is closed is preferably about 29,300 ohms at a rated frequency of 1000. The reactance or choke coil 14 having an impedance of about 500,000 ohms and is connected with the auto transformer through a condenser 15 of about two microfarads capacitance. The battery switch 13 may be of any type arranged to break the battery circuit when the device is not in use, such as by closing the cover of the terminal box.

The telephone circuit may be readily traced as follows: auto-transformer 16, conductor 27, condenser 19 or switch 20, switch 28, conductor 29, terminal 30, conductor 31, telephones 32, conductor 33, terminal 34, conductor 35, terminal 36 and conductor 37 back to auto-transformer 16. When switch 28 is thrown to the right to connect conductors 27 and 29 the terminals 7, 8 or 9, 10 may be connected with terminals 26, 23 respectively by throwing a switch 38 to the right or left. In this manner, the starboard or port microphones 1 or 2 may be connected to the telephone circuit, and by alternately connecting the same, the operator may determine which of the microphones sounds the loudest. The switch 38, as shown, is of the double throw multi-pole type, and in addition to the microphone circuits described, is also arranged to connect terminals 39, 36, 30 and 34 with contacts or terminals 40, 41, 42 and 43 respectively when thrown to the right, and terminals 39, 36, 30 and 34 with terminals 44, 45, 46 and 47 respectively when thrown to the left.

In addition to the microphone and telephone apparatus described, my invention includes a third unit which I shall for convenience designate as the direction finder. This unit includes a double throw multi-pole switch 48 having 8 terminals designated 49 to 56 adapted to be connected with contacts or terminals 57 to 64 respectively when the switch is thrown to the left, and with contacts or terminals 65 to 72 respectively when the switch is thrown to the right. Terminals 44 to 47 of switch 38 are connected to terminals 49 to 52 of switch 48 by conductors 73 to 76 respectively. Terminals 40 to 43 of switch 38 are connected to terminals 53 to 56 of switch 48 by conductors 77 to 80 respectively. On switch 48, terminals 57 to 60 are connected to terminals 72, 71, 69 and 70 by conductors 81 to 84 respectively and terminals 61 to 64 are connected to terminals 67, 68, 66 and 65 by conductors 85 to 88 respectively.

The primary coil 89 of a variable transformer 90 is connected across terminals 57, 58 and the secondary coil 91 of said transformer is connected across terminals 59, 60. 92 indicates the core of transformer 90, a portion 92' of which is movable to vary the magnetic gap by turning a screw 93, as will be readily understood. The screw 93 is operatively connected to a calibrated dial 94, so that by rotating the dial, the magnetic flux in the core may be varied. The dial 94 is preferably carefully calibrated by tests so that definite positions are indicated to correspond to different sound intensities which of course vary in accordance with the air gap in the magnetic circuit. The secondary coil 95 of an adjustable transformer 96 is connected across terminals 61, 62. The primary coil 97 of said transformer 96 is connected across terminals 63, 64. 98 indicates the core of this transformer, having a gap at 99 which may be varied by the screw member 100. The transformer 96 is carefully adjusted by means of the screw 100 until a given sound from each microphone is heard with equal intensity in the telephones with the dial of the transformer 90 in zero position. The adjustment of the transformer 96 is made at the time the apparatus is installed and need not be thereafter adjusted.

The terminal 39 of switch 38 is connected by conductor 101 to double throw switch 28.

Having described the details of a construction embodying my invention, I shall now describe its operation.

The switch 28 is thrown to the right to close the telephone circuit as above described, and the switch 38 is thrown from one side to the other to connect alternately the port and starboard microphones, and the operator by means of the telephone 32 determines which of the two microphones sounds the louder. The switch 38 is so arranged that when thrown to the right, the starboard microphone is connected and when thrown to the left, the port microphone is connected. Having determined which of the two microphones is the louder, the switch 28 is thrown to the left to connect the telephone circuit with the direction finder. If the louder sound has been heard on the starboard microphone, the direction finder switch 48 is thrown to the right and if the louder sound has been heard on the port microphone, the switch 48 is thrown to the left. The switch 48 remains in the position to which moved throughout a given operation. Assuming that the louder sound is heard on the starboard side, in which case the switches 38 and 48 are thrown to the right. In this position, the primary coil 89 of transformer 90 is connected to the starboard microphone 1, and the secondary coil 91 is connected to the telephone circuit. The circuit of primary coil 89 then comprises conductor 81, contacts 72, 56, conductor 80, contacts 40, 39, conductor 101, switch 28, conductors 27, 25, contacts 26, 7, switch 11, terminal 4, microphone 1, terminal 3, switch 11, contacts 8, 23, conductor 24, battery 12, switch 13, condenser 15, coil 16, conductor 37, contacts 36, 41, conductor 79, contacts 55, 71, conductor 82, and terminal 58 back to coil 89. The circuit of secondary coil 91 is terminal 60, conductor 84 contacts 70, 54, conductor 78, contacts 42, 30, conductor 31, telephone 32, conductor 33, contacts 34, 43, conductor 77, contacts 53, 69, conductor 83, and terminals 59 to coil 91.

When the switches 38 and 48 have been thrown to the right as indicated to listen to the sound from microphone 1, which is assumed to be the louder of the two, the intensity of the sound heard in the telephone has been slightly reduced by the consumption of energy by transformer 90. Consequently, when the louder sounding microphone is compared with the weaker sounding one, a similar reduction of sound must be made in the intensity of the weaker in order to obtain a true comparison of the intensities of the two. Therefore, the transformer 96 is electrically identical with transformer 90 in its zero position, and is employed when listening to the sound of the weaker sounding microphone.

Having listened to the sound of microphone 1, with the switches positioned as described, the operator then moves switch 38 to listen to the weaker sounding microphone 2, leaving the other switches as they were. In this case, the primary coil 97 of transformer 96 is connected to the circuit of port microphone 2 and the secondary coil 95 is connected to the telephone circuit. The circuit of primary coil 97 is, contact 63, conductor 87, contacts, 66, 50, conductor 74 to terminal 45, thence as previously described in connection with primary coil 89, back to contact 44, conductor 73, contacts 49, 65, conductor 88, and terminal 64 to coil 97. The circuit of secondary coil 95 is terminal 61, conductor 85, contacts 67, 51, conductor 75, contacts 46, 30, conductor 31, telephones 32, conductor 33, contacts 34, 47, conductor 76, contacts 52, 68, conductor 86 and terminal 62 to coil 95. After listening to the sound from microphone 2, the switch 38 is again thrown to the right to connect with microphone 1, and dial 94 is rotated to vary the intensity of the sound heard as above described until the intensity of the sound heard in microphone 1, the louder of the two, is reduced to the sound intensity of microphone 2, the weaker of the two. The switch 38 may be thrown from one position to the other as often as desired for comparing the sounds, and transformer 90 adjusted accordingly. When the sound intensities of the two microphones have been balanced as described, the dial indicates the direction of the source of sound. If the louder signal is heard in the port microphone 2, the switch 48 is thrown to the left so remaining for this particular operation, and the same procedure is followed as above described in connection with microphone 1.

It will be apparent that the direction of the source of sound or signals may be determined by swinging the ship and without the use of the circuit for equalizing intensity. When this is desired the switch 48 is placed in its neutral position and the switch 38 placed in either its right or left hand position. The switch 28 is then closed to connect the telephones 32 with the transformer 16, after which the switch 38 is thrown to the right or left in order to listen to the signals from the starboard and port microphones respectively. The ship is then swung on its course until the signals from the starboard and port microphones are of equal volume when it will be known that the source of signals or sounds are dead ahead, or dead astern if sets of microphones on the aft quarters be used, for which purpose the microphones 2 and 2' may be located aft and the switch 38 placed in its right hand position.

Fig. 2 illustrates another form which my invention may take in which the numerals 1 and 2 indicate as before two microphones. The microphone 1 is connected at one side to a battery 102 and on the other side with contacts 103 and 104 positioned on opposite sides of a double throw switch 105. Microphone 2 is similarly connected with battery 102 and contacts 106, 107 of switch 105. The switch blades 105' and 105'' are preferably of segmental form as shown in Fig. 3. These blades are of sufficient width to span respectively the contacts 103, 106 and 104, 107, when the switch 105 is in its neutral or middle position. The purpose of this arrangement is to short circuit the microphones while the switch is operated to connect one or the other of the microphones and thereby prevent a clicking sound in the telephones. For example, when the switch 105 is in the full line position shown in Fig. 3, in which microphone 2 is connected with contact 109, and it is desired to connect microphone 1 with contact 109 the switch 105 is thrown to the right as indicated in dotted lines in Fig. 3. During this movement microphones 1 and 2 are short circuited across contacts 104, 107 by blade 105' and across contacts 103, 106 by blade 105'' respectively and so remain until the circuit of microphone 2 is opened between contacts 107 and 109. The terminals 108 and 109 of switch 105 are connected to contacts 110 and 111 of switch 112 and battery 102 is connected with contacts 113 and 114 of switch 112 as shown. The blade 112' of switch 112 is similar to blades 105', 105'' of switch 105 and short circuits the telephones while the switch 112 is operated to prevent clicking sounds.

It is therefore clear that by throwing switch 105 to one side or the other, either of the microphones may be connected with switch 112. On switch 112, terminal 115 is intermediate contacts 110 and 111, and terminal 116 is intermediate contacts 113 and 114. The primary coil 117 of a transformer 118 is connected across contacts 115, 116 by conductors 119, 120. A choke coil 121 is in parallel, and a condenser 122 is in series with the coil 117. A condenser 123 preferably is of the order of one microfarad and is connected with an intermediate point in the coil 117 and may be connected thereto by switch 124. The purpose of the condenser 123 and the switch 124 is to greatly increase the volume of sound transmitted by the microphones 1 and 2, when the signals are weak owing to greater distances. I have found that a condenser of about one microfarad capacitance has this effect over a wide range of frequencies, such as from 50 to 1200 vibrations per second. Why this result is obtained, I cannot at present explain, but I have found that the volume is greatly increased irrespective of any question of resonance. From this it will be seen that either of the microphones may be connected with the primary coil 117 by switch 112. The switch 112 is also provided with contacts 125, 126, across which the secondary coil 127 is connected by conductors 128, 129 having a condenser 130 in parallel. The coils 117 and 127 are electrically similar and are wound on opposite poles 131 and 131' formed on a ring shaped yoke 132. Intermediate said poles is a rotatable armature 133, the pole faces being curved to accommodate the same. The winding 134 of armature 133 is connected across contacts 135, 136 of switch 112 by conductors 137, 138, with a condenser 139 in parallel. The armature 133 carries a pointer 140 arranged to cooperate with a scale 141 which is graduated to indicate the direction of the source of sound from a comparison of the intensities of the sound at different points and the adjustment necessary to balance the intensities. Switch 112 is also provided with terminals 142, 143 across which the telephone 144 is connected. From this it will be seen that the telephone 144 may be connected with either of the coils 127, 134. It will be apparent that the coil 127 is provided as an additional secondary for the transformer in order to eliminate the necessity of turning the armature coil 134 and its pointer 140 back to zero or to the position of maximum effect when throwing the microphone producing the weaker signals into circuit. In other words, the coil 127 is used when listening to the sounds from the weaker microphone in place of the coil 134 in order to compare the current in the coil 127 with the current produced by the reduced volume of signals as determined by the position of the coil 134, without returning the latter to zero position. It will be obvious, however, that the transformer may be used with only the coils 117 and 134 if the coil is turned to zero position each time the signals from the weaker microphone are listened to. The aft starboard and port microphones 2' and 1' may be connected with the switch 105 by means of the four pole switch 149, in which case the said aft microphones will be connected with the transformer and telephone circuits, and the procedure in finding direction astern is identical with that described in connection with the microphones 1 and 2.

Having described the structural details of this embodiment, its operation will be readily understood from the following brief description.

The switch 112 is thrown to the right to connect the telephone 144 with secondary coil 127, the armature coil 134 now being disconnected and inactive, so that lines of force may freely pass between the poles 131 and 131'. The operator then operates switch 105 to connect alternately microphones 1 and 2 with primary coil 117, and compares the intensities of the sounds of each. After having determined which of the microphones sounds the louder, the switch 105 is positioned to connect that microphone with switch 112, which, for purposes of illustration is assumed to be microphone 1. The switch 105 is thrown to the right. The switch 112 is then thrown to the left to connect the telephone with armature coil 134, and this coil is manually rotated clockwise until the intensity from microphone 1 has been reduced to that of the weaker microphone, which in the case assumed is microphone 2, in which position the pointer 140 will indicate the direction of the source of sound as above set forth. If the operator desires to make further comparisons between the modified signal now heard from the microphone 1 and the weaker signal from microphone 2, the switch 112 is thrown to the right to connect microphone 2 with the coil 127. When the switch 112 is again thrown to the left the microphone 1 will thus be in circuit with the rotary coil 134 as before.

While I have described my invention as embodied in concrete form in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim and desire to protect by Letters Patent is:

1. The method of finding the direction of sound which consists in alternately impressing upon a receiving circuit electric currents corresponding to the intensity of the sounds received at two spaced receiving stations, determining at which one of the spaced stations the currents caused by the sounds received are stronger through currents induced in a second circuit which is inductively connected with the first circuit and including the same magnetic circuit, inducing currents in a third circuit having a variable magnetic coupling in the same magnetic circuit as that of the first and second circuits, and varying the coupling of the third circuit, without changing the mutual induction between the first and second circuits, until the current in the third circuit is equal to that of the second circuit and determining the direction of the sound by the amount of variation made in said variable coupling.

2. The method of finding the direction of sound which consists in alternately impressing upon the primary of a transformer electric currents corresponding to the intensity of the sounds received by two spaced microphones, determining by a telephone connected with a secondary coil having the same magnetic circuit as the primary, the one of the two spaced microphones that is receiving the louder signal, connecting a rotatable secondary of the transformer with the telephone, connecting the louder microphone circuit with the primary and varying the coupling of said rotatable secondary, without changing the mutual inductance between the primary and the first named secondary coil, until the current in the circuit of the rotatable secondary is equal to that of the weaker microphone circuit and determining the direction of the sound by the angular variation made in said variable coupling.

Signed at New York, this 17th day of April, 1925.

WILLIAM L. WALKER.